United States Patent
Kim

(10) Patent No.: US 11,292,494 B2
(45) Date of Patent: Apr. 5, 2022

(54) APPARATUS AND METHOD FOR DETERMINING LEVELS OF DRIVING AUTOMATION

(71) Applicant: LG ELECTRONICS INC., Seoul (KR)

(72) Inventor: So Ryoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 16/796,642

(22) Filed: Feb. 20, 2020

(65) Prior Publication Data

US 2021/0122398 A1    Apr. 29, 2021

(30) Foreign Application Priority Data

Oct. 29, 2019 (KR) .................. 10-2019-0135335

(51) Int. Cl.
*B60W 60/00* (2020.01)
*H04W 4/46* (2018.01)
*G05D 1/00* (2006.01)
*B60W 40/09* (2012.01)

(52) U.S. Cl.
CPC ........ *B60W 60/0059* (2020.02); *B60W 40/09* (2013.01); *B60W 60/0017* (2020.02); *B60W 60/0053* (2020.02); *G05D 1/0022* (2013.01); *G05D 1/0038* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 10,249,194 B2 | 4/2019 | Erickson et al. | |
| 2017/0106876 A1* | 4/2017 | Gordon | B60W 30/182 |
| 2018/0348763 A1* | 12/2018 | Jiang | G06N 5/046 |
| 2020/0207371 A1* | 7/2020 | Dougherty | G05D 1/0066 |
| 2020/0341465 A1* | 10/2020 | Yun | B60W 50/14 |

* cited by examiner

*Primary Examiner* — James J Lee
*Assistant Examiner* — David Hatch
(74) *Attorney, Agent, or Firm* — Birch, Stewart, Kolasch & Birch, LLP

(57) ABSTRACT

An apparatus for determining levels of driving automation includes a controller configured to calculate a driving area of an ego vehicle using predetermined driving route information of the ego vehicle, and a transceiver configured to receive autonomous driving level information and driving information of a plurality of other vehicles in the driving area. The controller selects an overlap vehicle among the plurality of other vehicles based on the driving information, and determines an autonomous driving level of the ego vehicle.

17 Claims, 11 Drawing Sheets

APPARATUS AND METHOD FOR DETERMINING LEVELS OF DRIVING AUTOMATION

CROSS-REFERENCE TO RELATED APPLICATION

This present application claims the benefit of priority to Korean Patent Application No. 10-2019-0135335, entitled "APPARATUS AND METHOD FOR DETERMINING LEVELS OF DRIVING AUTOMATION," filed on Oct. 29, 2019, in the Korean Intellectual Property Office, the entire disclosure of which is incorporated herein by reference.

BACKGROUND

1. Technical Field

The present disclosure relates to a driving level changing system of a vehicle capable of driving in an autonomous driving mode, and more particularly, to an apparatus and method for determining levels of driving automation capable of determining an autonomous driving level of an ego vehicle by referring to an autonomous driving level of another vehicle.

2. Description of Related Art

As user requirements for vehicles increase, various systems have been developed to improve driver safety and convenience. In addition, development of autonomous vehicles is being actively conducted.

In general, autonomous vehicles can communicate with other autonomous vehicles regarding driving directions or the like through vehicle-to-vehicle communication. However, autonomous vehicles are often unable to communicate with other manual driving vehicles, and even if vehicle-to-vehicle communication is possible, the vehicles have limitations in communication regarding driving directions.

As one method in the related art for changing a driving route or a driving mode of an autonomous vehicle according to information of nearby vehicles in a situation where vehicle-to-vehicle communication is limited, there is a method for evaluating characteristics of drivers within a predetermined distance around an ego vehicle, and controlling driving of an ego vehicle according to the evaluation result, as disclosed in U.S. Pat. No. 10,249,194.

However, according to the method for adjusting a driving operation of the autonomous vehicle disclosed in U.S. Pat. No. 10,249,194, the autonomous vehicle collects a large amount of data from other vehicles within a predetermined distance and evaluates driving conditions without considering autonomous driving levels of the other vehicles. Thus, a relatively large amount of computation is required.

For this reason, there are limitations in that even when the number of autonomous vehicles that can communicate regarding the driving directions or the like through vehicle-to-vehicle communication increases on a road, not only does a waste of computational resources occur due to evaluating sensing data collected for all the other vehicles, but also the autonomous vehicle is giving top priority to safety, and is thus forced to carry out defensive driving in relation to nearby manual driving vehicles, resulting in a relative deterioration in driving quality.

Accordingly, there is a demand for a technology for determining a method for driving an ego vehicle in consideration of an autonomous driving level of other vehicles.

SUMMARY OF THE INVENTION

An aspect of the present disclosure is to provide an apparatus and method for determining levels of driving automation capable of using resources used for predicting driving of other vehicles for other uses, by carrying out driving control of an ego vehicle by referring to an autonomous driving level of other vehicles while driving.

Another aspect of the present disclosure is to provide an apparatus and method for determining levels of driving automation capable of preventing deterioration in driving quality of an ego vehicle which is driving in an autonomous driving mode due to another vehicle which is driving in a manual driving mode.

The present disclosure is not limited to what has been described above, and other aspects not mentioned herein will be apparent from the following description to one of ordinary skill in the art to which the present disclosure pertains.

An apparatus for determining levels of driving automation according to an embodiment of the present disclosure can determine an appropriate autonomous driving level of an ego vehicle by referring to an autonomous driving level of an overlap vehicle of which a driving area overlaps a driving area of the ego vehicle, among other vehicles.

Specifically, an apparatus for determining levels of driving automation according to an embodiment of the present disclosure may include a controller configured to calculate a driving area of an ego vehicle using predetermined driving route information of the ego vehicle, and a transceiver configured to receive autonomous driving level information and driving information of a plurality of other vehicles in the driving area, in which the controller selects an overlap vehicle among the plurality of other vehicles based on the driving information, and determines an autonomous driving level of the ego vehicle based on autonomous driving level information of the overlap vehicle.

The controller may select, as the overlap vehicle, a vehicle among the plurality of other vehicles that is driving in the same lane as a driving lane of the ego vehicle or driving in a lane adjacent to the driving lane of the ego vehicle, within a predetermined distance from the ego vehicle.

The controller may select, as a driving obstruction vehicle, an overlap vehicle of which the autonomous driving level is in level 0 to level 2 as defined by the Society of Automotive Engineers International, based on the autonomous driving level information of the overlap vehicle, and determine the autonomous driving level of the ego vehicle based on a ratio of the number of driving obstruction vehicles to the number of overlap vehicles.

The controller may determine the autonomous driving level of the ego vehicle from the autonomous driving level information of the overlap vehicle using a learning model which is trained using an artificial intelligence algorithm, and the learning model may be a model trained using a data set including the ratio of the number of driving obstruction vehicles to the number of overlap vehicles and the autonomous driving level of the ego vehicle, which are classified by assigning a label for a driving success or failure of a driver.

The apparatus for determining levels of driving automation may further include a storage configured to store driver information, and the controller may verify the autonomous driving level of the ego vehicle, which is determined based on the autonomous driving level information of the overlap vehicle, based on the driver information, and change the autonomous driving level of the ego vehicle according to the verification result.

The apparatus for determining levels of driving automation may further include a storage configured to store driver information, and the controller may verify the autonomous driving level of the ego vehicle, which is determined based on the autonomous driving level information of the overlap vehicle, based on the driver information, and change the driving route of the ego vehicle according to the verification result.

The driver information may be driver's license information.

The controller may move the ego vehicle to an autonomous driving safety zone in response to the autonomous driving level of the ego vehicle determined based on the autonomous driving level information of the overlap vehicle being required to be changed due to the driver not having a driver's license.

The transceiver may receive the driving information based on a downlink grant of a 5G network connected for the ego vehicle to operate in an autonomous driving mode.

A method for determining levels of driving automation according to another embodiment of the present disclosure may include calculating a driving area of an ego vehicle using predetermined driving route information of the ego vehicle, receiving autonomous driving level information and driving information of a plurality of other vehicles in the driving area, selecting an overlap vehicle among the plurality of other vehicles based on the driving information, and determining an autonomous driving level of the ego vehicle based on the autonomous driving level information of the overlap vehicle.

The selecting of the overlap vehicle among the plurality of other vehicles may include selecting, as the overlap vehicle, a vehicle among the plurality of other vehicles that is driving in the same lane as a driving lane of the ego vehicle or driving in a lane adjacent to the driving lane of the ego vehicle, within a predetermined distance from the ego vehicle.

The determining of the autonomous driving level of the ego vehicle may include selecting, as a driving obstruction vehicle, an overlap vehicle of which the autonomous driving level is in level 0 to level 2 as defined by the Society of Automotive Engineers International, based on autonomous driving level information of the overlap vehicle, and determining the autonomous driving level of the ego vehicle based on a ratio of the number of driving obstruction vehicles to the number of overlap vehicles.

The determining the autonomous driving level of the ego vehicle based on the ratio of the number of driving obstruction vehicles to the number of overlap vehicles may include determining the autonomous driving level of the ego vehicle from the autonomous driving level information of the overlap vehicle using a learning model which is trained using an artificial intelligence algorithm, and the learning model may be a model trained using a data set including the ratio of the number of driving obstruction vehicles to the number of overlap vehicles and the autonomous driving level of the ego vehicle, which are classified by assigning a label for a driving success or failure of a driver.

The method for determining levels of driving automation may further include storing driver information, verifying the autonomous driving level of the ego vehicle, which is determined based on the autonomous driving level information of the overlap vehicle, based on the driver information, and changing the autonomous driving level of the ego vehicle according to the verification result in the verifying.

The method for determining levels of driving automation may further include storing driver information, verifying the autonomous driving level of the ego vehicle, which is determined based on the autonomous driving level information of the overlap vehicle, based on the driver information, and changing the driving route of the ego vehicle according to the verification result in the verifying.

The driver information may be driver's license information.

The changing of the driving route of the ego vehicle may include moving the ego vehicle to an autonomous driving safety zone in response to the autonomous driving level of the ego vehicle determined based on the autonomous driving level information of the overlap vehicle being required to be changed due to the driver not having a driver's license.

The receiving of the driving information may include receiving the driving information based on a downlink grant of a 5G network connected for the ego vehicle to operate in an autonomous driving mode.

A computer-readable recording medium on which an autonomous driving level determining program is recorded according to still another embodiment of the present disclosure and the autonomous driving level determining program may cause a computer to perform calculating of a driving area of an ego vehicle using predetermined driving route information of an ego vehicle, receiving of autonomous driving level information and driving information of a plurality of other vehicles in the driving area, selecting of an overlap vehicle among the plurality of other vehicles based on the driving information, and determining of an autonomous driving level of the ego vehicle based on the autonomous driving level information of the overlap vehicle.

Details of other embodiments are included in the detailed description and drawings.

According to embodiments of the present disclosure, instead of predicting the driving direction of another vehicle through sensing data, the possibility of obstruction of another vehicle is determined through autonomous driving level information of another vehicle which can be easily collected, and as a result, resources used in the sensing and calculating of the ego vehicle can be economically managed.

According to the embodiments of the present disclosure, when the number of driving obstruction vehicles in the vicinity of the ego vehicle is large, the driving route of the ego vehicle is changed to a route with fewer driving obstruction vehicles, and as a result, driving quality of the ego vehicle can be maintained.

Embodiments of the present disclosure are not limited to the embodiments described above, and other embodiments not mentioned above will be clearly understood from the description below.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
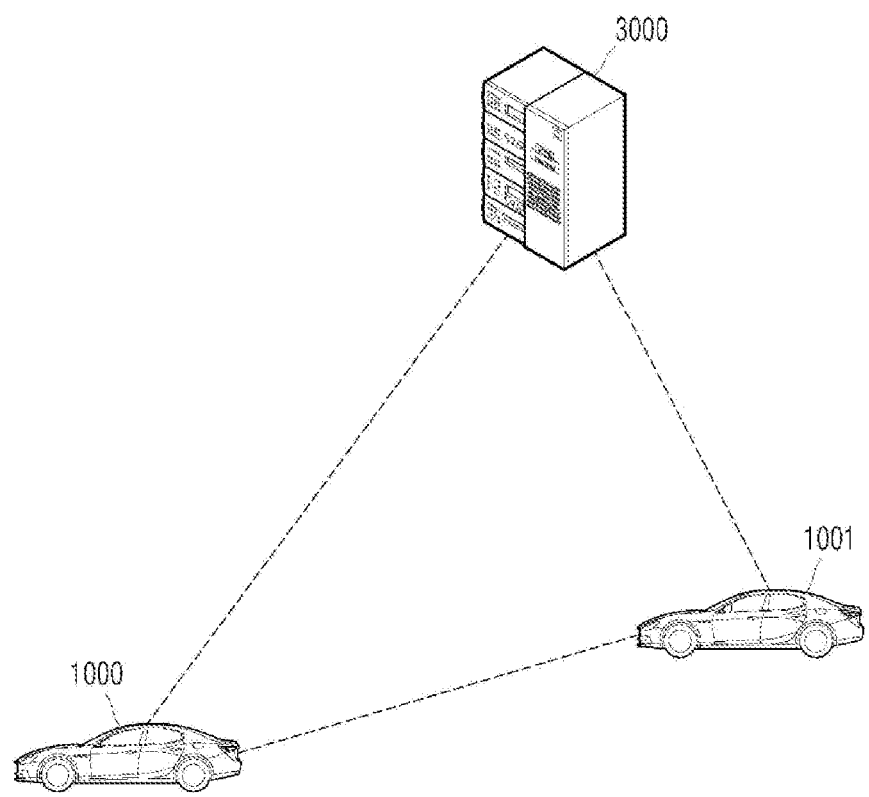
FIG. 1 is a diagram illustrating a system to which an apparatus for determining levels of driving automation is applied according to an embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. Further, in the description of the embodiments of the present disclosure, when it is determined that the detailed description of the related art would obscure the gist of the present disclosure, the description thereof will be omitted. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms "a," "an," and "the" may be intended to include the plural forms as well, unless the context clearly indicates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in the present specification may refer to an automobile and a motorcycle. Hereinafter, the vehicle will be exemplified as an automobile.

The vehicle described in the present disclosure may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system to which an apparatus for determining levels of driving automation is applied according to an embodiment of the present disclosure.

Referring to FIG. 1, a vehicle 1000, which is an ego vehicle, may receive autonomous driving level information and driving information from another vehicle 1001 through vehicle to everything (V2X) communication.

In this case, the autonomous driving level information may include six levels, from level 0 to level 5, as classified by the Society of Automotive Engineers International. However, the autonomous driving level information is not limited thereto, and may also include five levels as defined by the U.S. National Highway Traffic Safety Administration (NHTSA).

Each level will be described below based on the autonomous levels as defined by the Society of Automotive Engineers International.

Level 0 refers to a no automation level in which, in manual vehicles that do not provide V2X communication, forward collision-avoidance assist (FCA), and blind-spot collision warning (BCW), which allow a system to simply warn and temporarily intervene for safety reasons during driving, are supported. Therefore, in level 0, the driver fully controls the vehicle.

Level 1 refers to a driver assistance level in which, in manual vehicles in which a system performs either steering or deceleration/acceleration in a specific driving mode, lane following assist (LFA), smart cruise control (SCC), and the like are supported. Therefore, in level 1, the driver should be aware of the speed or the like.

Level 2 refers to a partial automation level in which, in autonomous vehicles in which a system performs both steering and deceleration/acceleration in a specific driving mode, highway driving assistance (HDA) or the like is supported. Therefore, in level 2, the driver should be aware of objects or the like.

Up to level 2, the system assists in partial driving of a vehicle, but from level 3 onward, the system can perform (pilot) the entire driving. That is, the vehicle 1000 may change a lane or overtake a vehicle ahead, and avoid obstacles, of its own accord.

Level 3 refers to a conditional automation level, in which a vehicle is controlled while simultaneously recognizing a driving environment, but the driver is requested to take control of the vehicle in an emergency situation. Therefore, in level 3, the driver should be aware of a specific road condition.

Level 4 refers to an advanced automation level in which a system can perform the entire driving as in level 3, and can in addition safely cope with the occurrence of dangerous situations. Therefore, in level 4, a driver should be aware of weather, disasters, and accidents.

Level 5 refers to a complete automation level in which, unlike in level 4, there is no restriction on areas where autonomous driving can be performed. In level 5, the driver's awareness is unnecessary.

The vehicle 1000 may receive, from a server 3000, driving information including a real-time traffic situation based on a downlink grant of a 5G network.

Figure 2:
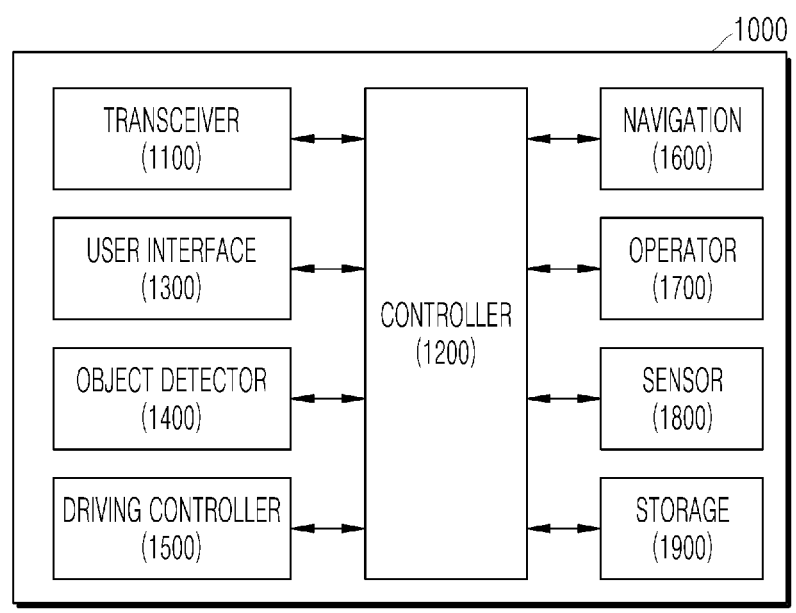
FIGS. 2 and 3 are block diagrams illustrating an apparatus for determining levels of driving automation installed at a vehicle side according to an embodiment of the present disclosure.
Figure 3:
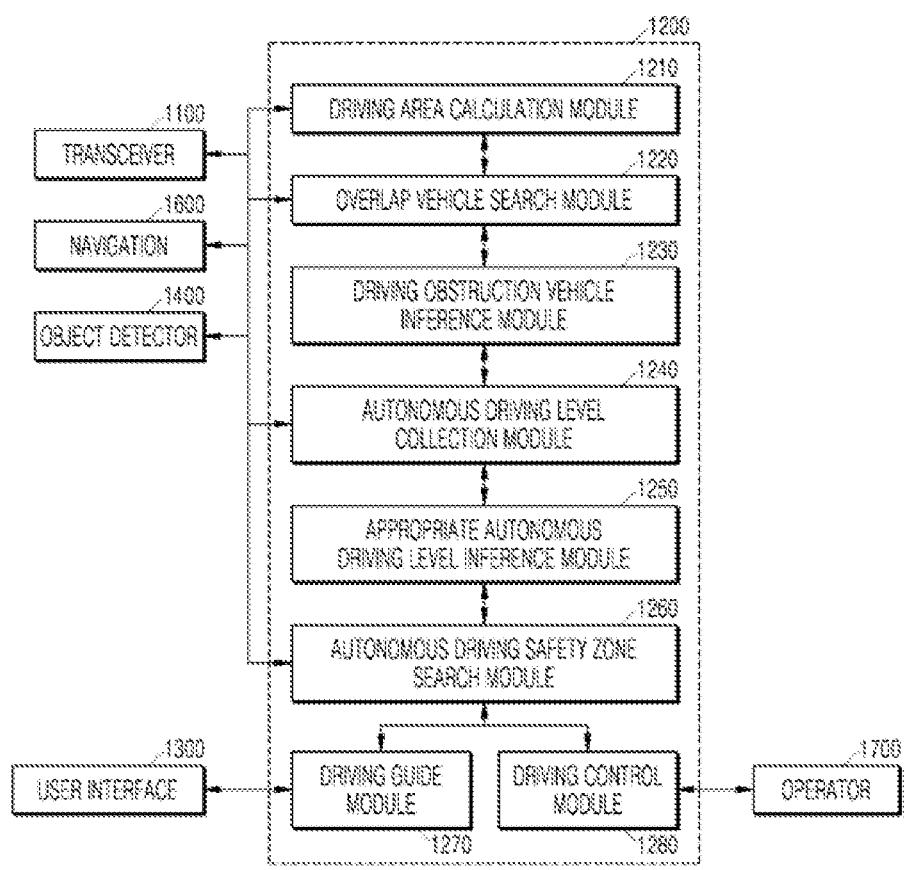

FIGS. 2 and 3 are block diagrams illustrating an apparatus for determining levels of driving automation installed at a vehicle side according to an embodiment of the present disclosure.

Referring to FIG. 2, the apparatus for determining levels of driving automation may include a transceiver 1100, a controller 1200, a user interface 1300, an object detector 1400, a driving controller 1500, a navigation 1600, an operator 1700, a sensor 1800, and a storage 1900.

Depending on the embodiment, the vehicle 1000 to which the apparatus for determining levels of driving automation is applied may include other components in addition to those illustrated in FIG. 2 and described below, or may not include some of the components illustrated in FIG. 2 and described below. In addition, although FIG. 2 illustrates the apparatus for determining levels of driving automation as being mounted on the vehicle 1000, which is an ego vehicle, the same apparatus may be applied to other vehicles 1001.

The vehicle 1000 may be switched from an autonomous driving mode to a manual mode or switched from the manual mode to the autonomous driving mode depending on the driving situation. Here, the driving situation may be judged by at least one of the information received by the transceiver 1100, the external object information detected by the object detector 1400, or the navigation information acquired by the navigation 1600.

The vehicle 1000 may be switched from the autonomous driving mode to the manual mode, or from the manual mode to the autonomous driving mode, according to a user input received through the user interface 1300.

When the vehicle 1000 is operated in the autonomous driving mode, the vehicle 1000 may be operated under the control of the operator 1700 that controls driving, parking, and unparking. When the vehicle 1000 is operated in the manual mode, the vehicle 1000 may be operated by an input of the driver's mechanical driving operation.

The transceiver 1100 is a module for performing communication with an external device. Here, the external device may be another vehicle 1001 or the server 3000.

The transceiver 1100 may include at least one of a transmission antenna, a reception antenna, a radio frequency (RF) circuit capable of implementing various communication protocols, or an RF element in order to perform communication.

The transceiver 1100 may perform short range communication, GPS signal reception, V2X communication, optical communication, broadcast transmission/reception, and intelligent transport systems (ITS) communication functions.

The transceiver 1100 may further support other functions than the functions described, or may not support some of the functions described, depending on the embodiment.

The transceiver 1100 may support short-range communication by using at least one of Bluetooth, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB) technologies.

The transceiver 1100 may form short-range wireless communication networks so as to perform short-range communication between the vehicle 1000 and at least one external device.

The transceiver 1100 may include a Global Positioning System (GPS) module or a Differential Global Positioning System (DGPS) module for acquiring position information of the vehicle 1000.

The transceiver 1100 may include a module for supporting wireless communication between the vehicle 1000 and a server 3000 (V2I: vehicle to infrastructure), communication with another vehicle (V2V: vehicle to vehicle) or communication with a pedestrian (V2P: vehicle to pedestrian). That is, the vehicle transceiver 1100 may include a V2X communication module. The V2X communication module may include an RF circuit capable of implementing V2I, V2V, and V2P communication protocols.

The transceiver 1100 may receive, for example, autonomous driving level information and driving information of a plurality of other vehicles in a driving area of the vehicle 1000 through the V2X communication module.

The transceiver 1100 may include an optical communication module for communicating with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the vehicle 1000.

The transceiver 1100 may include a broadcast communication module for receiving a broadcast signal from an external broadcast management server through a broadcast channel, or transmitting a broadcast signal to the broadcast management server. The broadcast channel may include a satellite channel and a terrestrial channel. Examples of the broadcast signal may include a TV broadcast signal, a radio broadcast signal, and a data broadcast signal.

The transceiver 1100 may include an ITS communication module for exchanging information, data, or signals with a traffic system. The ITS communication module may provide acquired information and data to the traffic system. The ITS communication module may receive information, data or signals from the traffic system. For example, the ITS communication module may receive road traffic information from the traffic system, and provide the information to the controller 1200. For example, the ITS communication module may receive a control signal from the traffic system, and provide the control signal to the controller 1200 or a processor provided in the vehicle 1000.

Depending on the embodiment, the overall operation of each module of the transceiver 1100 may be controlled by a separate processor provided in the transceiver 1100. The transceiver 1100 may include a plurality of processors, or may not include a processor. When the transceiver 1100 does not include a processor, the transceiver 1100 may be operated under the control of the processor of another device in the vehicle 100 or the controller 1200.

The transceiver 1100 may implement a vehicle display device together with the user interface 1300. In this case, the vehicle display device may be referred to as a telematics device or an audio video navigation (AVN) device.

Figure 4:
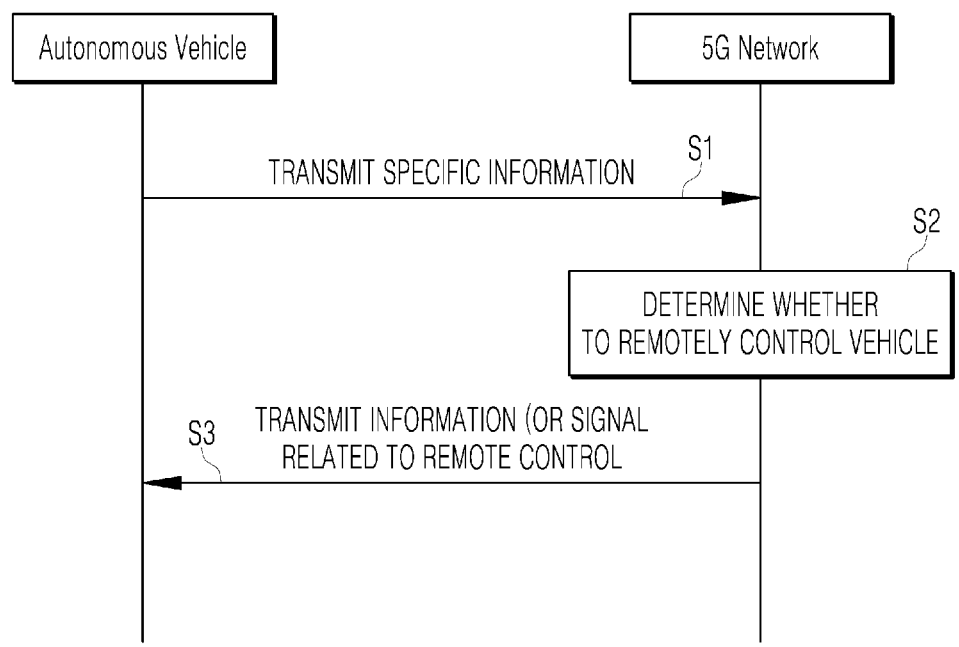
FIG. 4 is a diagram showing an example of the basic operation of an autonomous vehicle and a 5G network in a 5G communication system.
Figure 5:
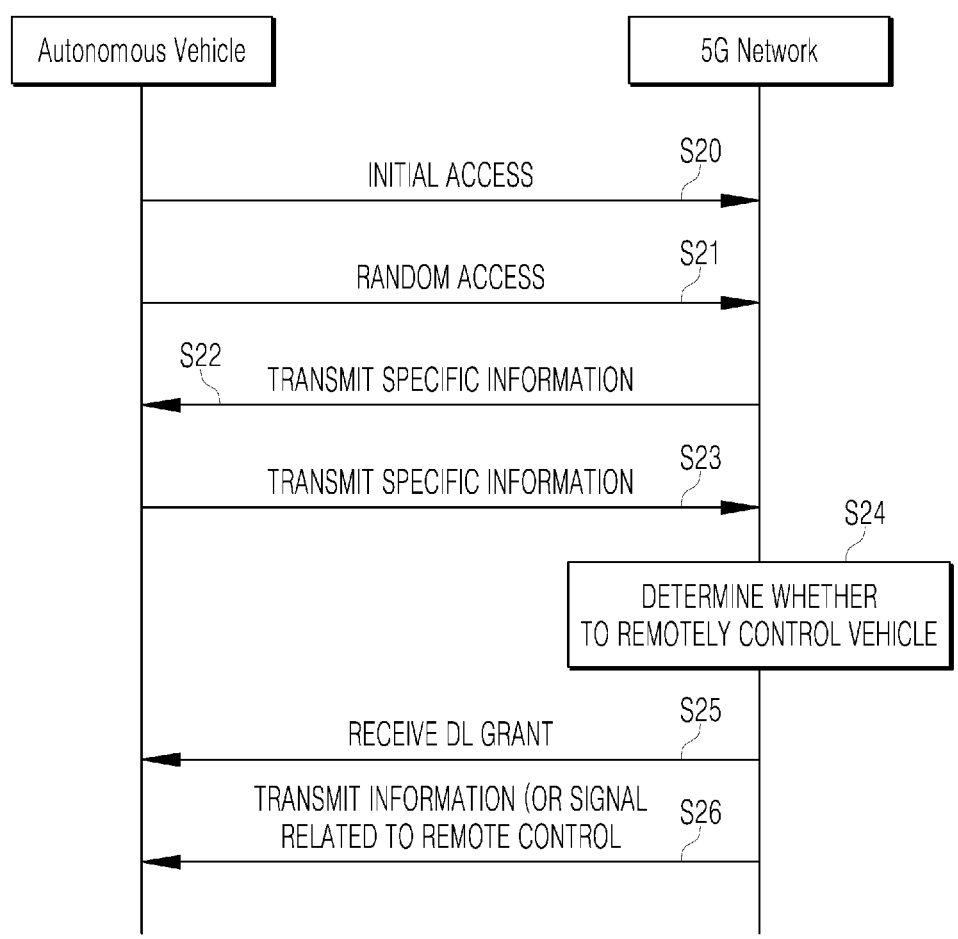
FIG. 5 is a diagram illustrating an example of an application operation of an autonomous vehicle and a 5G network in a 5G communication system.

FIG. 4 is a diagram showing an example of the basic operation of an autonomous vehicle and a 5G network in a 5G communication system.

The transceiver 1100 may transmit specific information over a 5G network when the vehicle 1000 is operated in the autonomous driving mode.

The specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information about the destination and the safety level of the vehicle, which are inputted through the user interface 1300.

In addition, the 5G network can determine whether the vehicle is remotely controlled (S2).

The 5G network may include a server or a module for performing remote control related to autonomous driving.

The 5G network may transmit information (or a signal) related to the remote control to an autonomous vehicle (S3).

As described above, information related to the remote control may be a signal directly applied to the autonomous vehicle, and may further include service information necessary for autonomous driving, such as driving information. The autonomous vehicle according to this embodiment may receive service information such as insurance for each interval selected on a driving route and risk interval information, through a server connected to the 5G network to provide services related to autonomous driving.

An essential process for performing 5G communication between the autonomous vehicle 1000 and the 5G network (for example, an initial access process between the vehicle 1000 and the 5G network) will be briefly described with reference to FIG. 5 to FIG. 9 below.

An example of application operations through the autonomous vehicle 1000 performed in the 5G communication system and the 5G network is as follows.

The vehicle 1000 may perform an initial access process with the 5G network (initial access step, S20). In this case, the initial access procedure includes a cell search process for acquiring downlink (DL) synchronization and a process for acquiring system information.

The vehicle 1000 may perform a random access process with the 5G network (random access step, S21). At this time, the random access procedure includes an uplink (UL) synchronization acquisition process or a preamble transmission process for UL data transmission, a random access response reception process, and the like.

The 5G network may transmit an Uplink (UL) grant for scheduling transmission of specific information to the autonomous vehicle 1000 (UL grant receiving step, S22).

The procedure by which the vehicle 1000 receives the UL grant includes a scheduling process in which a time/frequency resource is allocated for transmission of UL data to the 5G network.

The autonomous vehicle 1000 may transmit specific information over the 5G network based on the UL grant (specific information transmission step, S23).

The 5G network may determine whether the vehicle 1000 is to be remotely controlled based on the specific information transmitted from the vehicle 1000 (vehicle remote control determination step, S24).

The autonomous vehicle 1000 may receive the DL grant through a physical DL control channel for receiving a response on pre-transmitted specific information from the 5G network (DL grant receiving step, S25).

The 5G network may transmit information (or a signal) related to the remote control to the autonomous vehicle 1000 based on the DL grant (remote control related information transmission step, S26).

A process in which the initial access process and/or the random access process between the 5G network and the autonomous vehicle 1000 is combined with the DL grant receiving process has been exemplified. However, the present disclosure is not limited thereto.

For example, an initial access procedure and/or a random access procedure may be performed through an initial access step, an UL grant reception step, a specific information transmission step, a remote control decision step of the vehicle, and an information transmission step associated with remote control. Further, an initial access procedure and/or a random access procedure may be performed through a random access step, an UL grant reception step, a specific information transmission step, a remote control decision step of the vehicle, and an information transmission step associated with remote control. The autonomous vehicle 1000 may be controlled by the combination of an AI operation and the DL grant receiving process through the specific information transmission step, the vehicle remote control determination step, the DL grant receiving step, and the remote control related information transmission step.

The operation of the autonomous vehicle 1000 described above is merely exemplary, but the present disclosure is not limited thereto.

For example, the operation of the autonomous vehicle 1000 may be performed by selectively combining the initial access step, the random access step, the UL grant receiving step, or the DL grant receiving step with the specific information transmission step, or the remote control related information transmission step. The operation of the autonomous vehicle 1000 may include the random access step, the UL grant receiving step, the specific information transmission step, and the remote control related information transmission step. The operation of the autonomous vehicle 1000 may include the initial access step, the random access step, the specific information transmission step, and the remote control related information transmission step. The operation of the autonomous vehicle 1000 may include the UL grant receiving step, the specific information transmission step, the DL grant receiving step, and the remote control related information transmission step.

Figure 6:
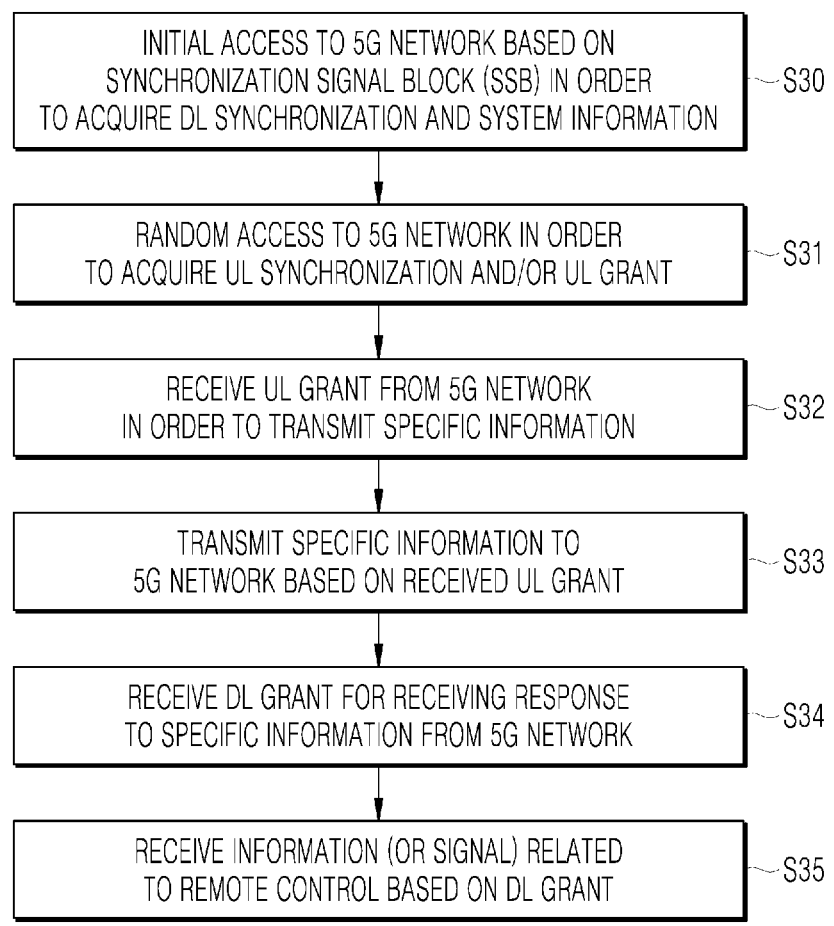
FIGS. 6 to 9 are diagrams illustrating an example of the operation of the autonomous vehicle using 5G communication.

As illustrated in FIG. 6, the vehicle 1000 including an autonomous driving module may perform an initial access process with the 5G network based on Synchronization Signal Block (SSB) for acquiring DL synchronization and system information (initial access step, S30).

The autonomous vehicle 1000 may perform a random access process with the 5G network for UL synchronization acquisition and/or UL transmission (random access step, S31).

The autonomous vehicle 1000 may receive the UL grant from the 5G network for transmitting specific information (UL grant receiving step, S32).

The autonomous vehicle 1000 may transmit the specific information to the 5G network based on the UL grant (specific information transmission step, S33).

The autonomous vehicle 1000 may receive the DL grant from the 5G network for receiving a response to the specific information (DL grant receiving step, S34).

The autonomous vehicle 1000 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. Further, a QCL relationship may be added to the DL grant reception step with respect to the beam receiving direction of the PDCCH including the DL grant.

Figure 7:
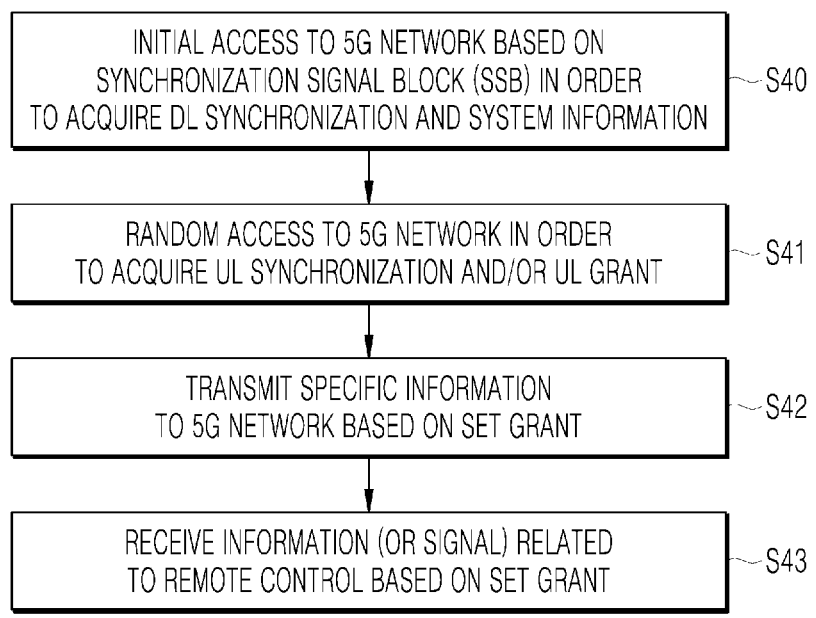

As illustrated in FIG. 7, the autonomous vehicle 1000 may perform an initial access process with the 5G network based on SSB for acquiring DL synchronization and system information (initial access step, S40).

The autonomous vehicle 1000 may perform a random access process with the 5G network for UL synchronization acquisition and/or UL transmission (random access step, S41).

The autonomous vehicle 1000 may transmit specific information based on a configured grant to the 5G network (UL grant receiving step, S42). In other words, instead of receiving the UL grant from the 5G network, the configured grant may be received.

The autonomous vehicle 1000 may receive the remote control related information (or a signal) from the 5G network based on the configured grant (remote control related information receiving step, S43).

Figure 8:
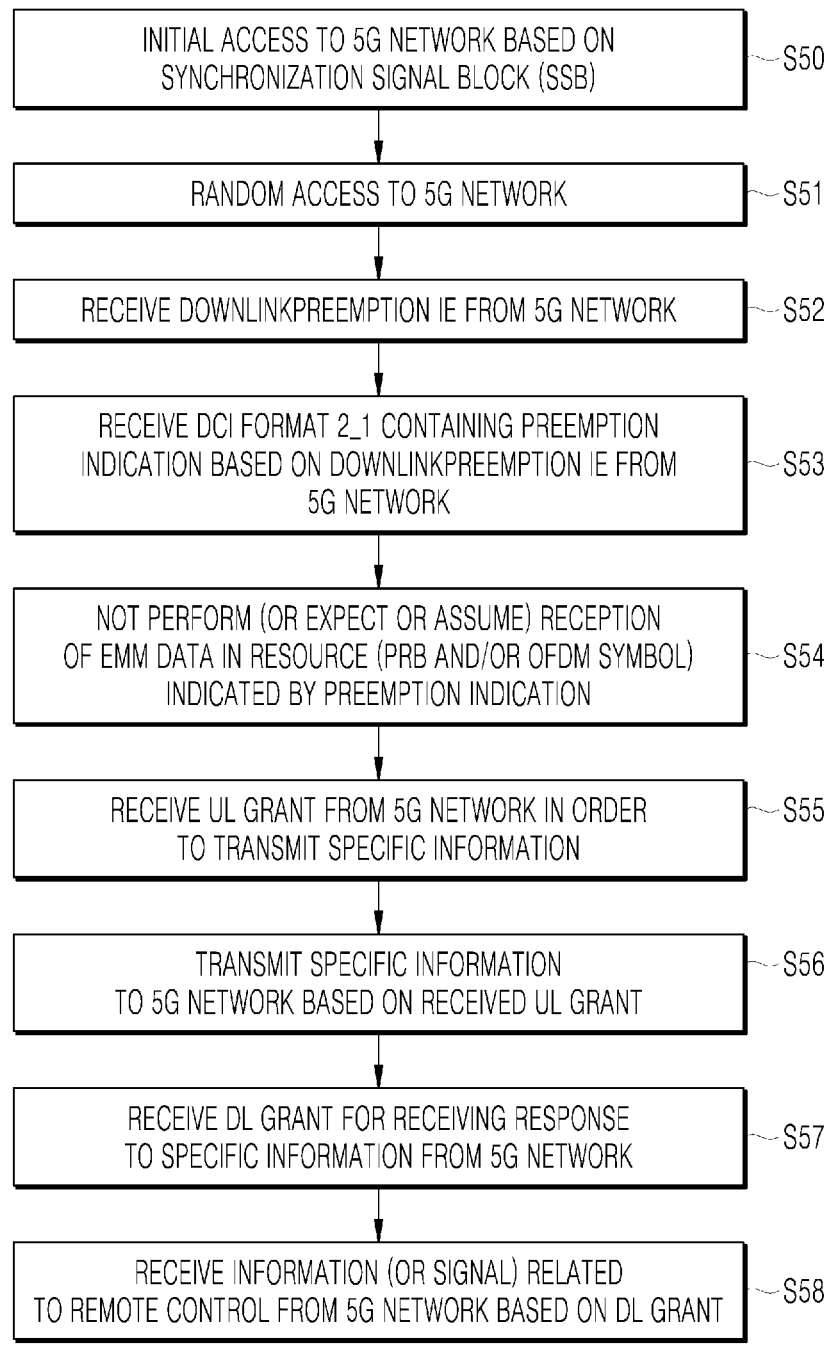

As illustrated in FIG. 8, the autonomous vehicle 1000 may perform an initial access process with the 5G network based on SSB for acquiring DL synchronization and system information (initial access step, S50).

The autonomous vehicle 1000 may perform a random access process with the 5G network for UL synchronization acquisition and/or UL transmission (random access step, S51).

In addition, the autonomous vehicle 1000 may receive Downlink Preemption (DL) and Information Element (IE) from the 5G network (DL Preemption IE reception step, S52).

The autonomous vehicle 1000 may receive DCI (Downlink Control Information) format 2_1 including preemption indication based on the DL preemption IE from the 5G network (DCI format 2_1 receiving step, S53).

The autonomous vehicle 1000 may not perform (or expect or assume) the reception of eMBB data in the resource (PRB and/or OFDM symbol) indicated by the pre-emption indication (step of not receiving eMBB data, S54).

The autonomous vehicle 1000 may receive the UL grant over the 5G network for transmitting specific information (UL grant receiving step, S55).

The autonomous vehicle 1000 may transmit the specific information to the 5G network based on the UL grant (specific information transmission step, S56).

The autonomous vehicle 1000 may receive the DL grant from the 5G network for receiving a response to the specific information (DL grant receiving step, S57).

The autonomous vehicle 1000 may receive the remote control related information (or signal) from the 5G network based on the DL grant (remote control related information receiving step, S58).

Figure 9:
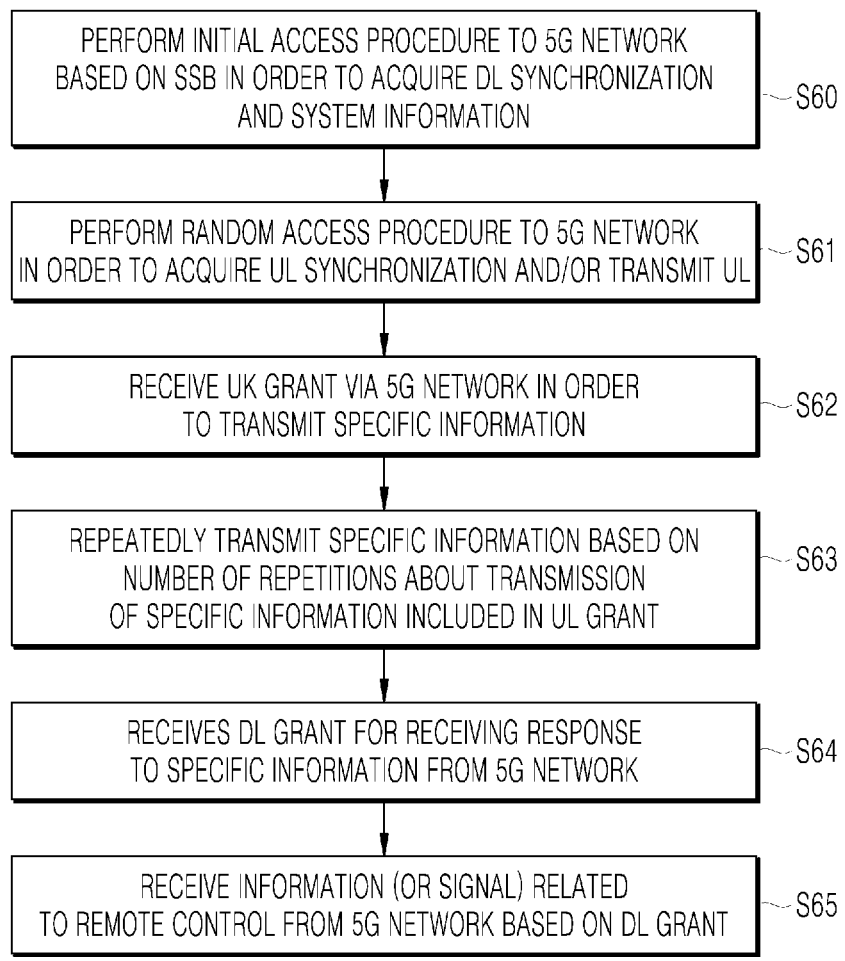

As illustrated in FIG. 9, the autonomous vehicle 1000 may perform an initial access process with the 5G network based on SSB for acquiring DL synchronization and system information (initial access step, S60).

The autonomous vehicle 1000 may perform a random access process with the 5G network for UL synchronization acquisition and/or UL transmission (random access step, S61).

The autonomous vehicle 1000 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous vehicle 1000 may transmit the specific information to the 5G network based on the UL grant.

Also, the repetitive transmission of specific information may be performed through frequency hopping, the first specific information may be transmitted in the first frequency resource, and the second specific information may be transmitted in the second frequency resource.

The specific information may be transmitted through Narrowband of 6 Resource Block (6RB) and 1 Resource Block (1RB).

The autonomous vehicle 1000 may receive the DL grant from the 5G network for receiving a response to the specific information (DL grant receiving step, S64).

The autonomous vehicle 1000 may receive the remote control related information (or signal) from the 5G network based on the DL grant (remote control related information receiving step, S65).

The above-described 5G communication technique can be applied in combination with the embodiment proposed in this specification, which will be described in FIG. 1 to FIG. 12, or supplemented to specify or clarify the technical feature of the embodiment proposed in this specification.

The vehicle 1000 may be connected to an external server through a communication network, and may be capable of moving along a predetermined route without a driver's intervention by using an autonomous driving technique.

In the following embodiments, the user may be interpreted as a driver, a passenger, or the owner of a user terminal.

While the vehicle 1000 is driving in the autonomous driving mode, the type and frequency of accident occurrence may depend on the capability of the vehicle 1000 of sensing dangerous elements in the vicinity in real time. The route to the destination may include sectors having different levels of risk due to various causes such as weather, terrain characteristics, traffic congestion, and the like.

At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 1000 may operate in association with at least one artificial intelligence module or robot included in the vehicle 1000 in the autonomous driving mode.

For example, the vehicle 1000 may interact with at least one robot. The robot may be an autonomous mobile robot (AMR). The mobile robot is capable of moving by itself, may freely move, and may be equipped with a plurality of sensors so as to be capable of avoiding obstacles during traveling. The mobile robot may be a flying robot (for example, a drone) having a flight device. The mobile robot may be a wheeled robot having at least one wheel and moving by means of the rotation of the wheel. The mobile robot may be a legged robot having at least one leg and being moved using the leg.

The robot may function as a device that complements the convenience of a vehicle user. For example, the robot may perform a function of moving a load placed on the vehicle 1000 to the final destination of the user. For example, the robot may perform a function of guiding the user, who has alighted from the vehicle 1000, to the final destination. For example, the robot may perform a function of transporting the user, who has alighted from the vehicle 1000, to the final destination.

At least one electronic device included in the vehicle 1000 may communicate with the robot through a communication device.

At least one electronic device included in the vehicle 1000 may provide the robot with data processed by at least one electronic device included in the vehicle. For example, at least one electronic device included in the vehicle 1000 may provide the robot with at least one of object data indicating an object around the vehicle, HD map data, vehicle state data, vehicle position data, or driving plan data.

At least one electronic device included in the vehicle 1000 can receive data processed by the robot from the robot. At least one electronic device included in the vehicle 1000 can receive at least one of sensing data, object data, robot state data, robot position data, and movement plan data of the robot, which are generated by the robot.

At least one electronic device included in the vehicle 1000 may generate a control signal based on data received from the robot. For example, at least one electronic device included in the vehicle may compare the information about the object generated by the object detection device with the information about the object generated by the robot, and generate a control signal based on the comparison result. At least one electronic device included in the vehicle 1000 may generate a control signal so as to prevent interference between the route of the vehicle and the route of the robot.

At least one electronic apparatus included in the vehicle 1000 may include a software module or a hardware module for implementing an artificial intelligence (AI) (hereinafter referred to as an artificial intelligence module). At least one electronic device included in the vehicle may input the acquired data to the AI module, and use the data which is outputted from the AI module.

The artificial intelligence module may perform machine learning on input data using at least one artificial neural network (ANN). The artificial intelligence module may output driving plan data through machine learning on the input data.

At least one electronic device included in the vehicle 1000 can generate a control signal based on data which is output from the AI module.

At least one electronic device included in the vehicle 1000 may receive data processed by artificial intelligence, from an external device, via a communication device, depending on the embodiment. At least one electronic device included in the vehicle 1000 may generate a control signal based on data processed by artificial intelligence.

The transceiver 1100 may receive the driving information based on the downlink grant of the 5G network connected for the ego vehicle to operate in the autonomous driving mode.

The controller 1200 may receive a control signal of the server 3000 through the transceiver 1100, and control the autonomous driving mode operation according to the control signal.

As illustrated in FIG. 3, the controller 1200 may include a driving area calculation module 1210, an overlap vehicle search module 1220, a driving obstruction vehicle inference module 1230, an autonomous driving level collection module 1240, an appropriate autonomous driving level inference module 1250, an autonomous driving safety zone search module 1260, a driving guide module 1270, and a driving control module 1280.

The controller 1200, for example, the driving area calculation module 1210, may receive the predetermined driving route information of the ego vehicle from the navigation 1600, and use the received driving route information of the ego vehicle to calculate the driving area of the ego vehicle.

The controller 1200 may calculate a possible straight driving distance in consideration of the speed and the route of the vehicle 1000 based on data including a section and a lane where the vehicle 1000 is expected to be driven, and set the calculated distance as the distance of the driving area. The controller 1200 may determine an intersection, an entry or exit road driving scheduled section, and a left-turn or right-turn scheduled section, as an area that cannot be defined as a driving area, and determine a driving area excluding the area that cannot be defined as a driving area when calculating the driving area.

For example, the controller 1200 may determine a section in which the vehicle is expected to pass through a four-lane intersection 100 m ahead as the area that cannot be defined as a driving area. In addition, the controller 1200 may determine a section in which the vehicle is expected to go 1 km straight ahead as a driving area having a distance of 1 km.

The controller 1200, for example, the overlap vehicle search module 1220, receives driving information from a plurality of other vehicles 1001 driving in a driving area through the transceiver 1100, and selects an overlap vehicle among the plurality of other vehicles 1001 based on the received driving information.

The controller 1200 may refer to the driving information to select, as the overlap vehicle, a vehicle among the plurality of other vehicles that is driving in the same lane as a driving lane of the ego vehicle or driving in a similar driving area to the ego vehicle (that is, in lanes adjacent to the driving lane of the ego vehicle), within a predetermined distance from the ego vehicle (for example, within 100 meters). The controller 1200 may refer to the driving information to select, as the overlap vehicle, a vehicle driving in a similar driving area as well as a vehicle expected to drive in a similar driving area, among the plurality of other vehicles.

For example, when the vehicle 1000, which is the ego vehicle, is driving in a second lane of four lanes and is expected to travel 1 km straight ahead, the controller 1200 may define an area including all lanes of the road up to a distance of 1 km as a driving area, and select, as an overlap vehicle, a vehicle driving in the first to third lanes among the vehicles in the driving area. In addition, the controller 1200 may select, as an overlap vehicle, among vehicles driving in the fourth lane, a vehicle expected to drive in the second lane within the driving area, based on the driving information.

When another vehicle is a manual driving vehicle that cannot transmit driving information, the controller 1200 may select the other vehicle as an overlap vehicle according to whether the other vehicle is positioned within a similar driving area to the ego vehicle based on current positional information of the other vehicle acquired through the object detector 1400 or the like.

The controller 1200 may re-select and update the overlap vehicle in real-time as the vehicle 1000 moves. For example, the controller 1200 may select five overlap vehicles while the vehicle 1000 is driving on the Yangjae Boulevard and select one overlap vehicle as the vehicle 1000 enters the Olympic Boulevard.

The controller 1200, for example, the driving obstruction vehicle inference module 1230, may select, as the driving obstruction vehicle, an overlap vehicle of which the autonomous driving level is in level 0 to level 2 as defined by the Society of Automotive Engineers International, based on the autonomous driving level information of the overlap vehicle provided through the transceiver 1100.

In addition, the controller 1200 may select an overlap vehicle driving within the section closest to the ego vehicle, for example, a section within 100 meters from the ego vehicle, as a driving obstruction vehicle in cases in which the overlap vehicle is expected to change lanes to the lane of an ego vehicle, the overlap vehicle is the closest vehicle among a plurality of other vehicles driving in the same lane as the driving lane of the ego vehicle or driving in a lane adjacent to the driving lane of the ego vehicle, the speed of a trailing overlap vehicle is faster than that of the ego vehicle, or the speed of a preceding overlap vehicle is slower than that of the ego vehicle.

The controller 1200, for example, the appropriate autonomous driving level inference module 1250, may determine the autonomous driving level of the vehicle 1000, which is the ego vehicle, based on the autonomous driving information of the overlap vehicle.

The controller 1200 may determine the autonomous driving level of the ego vehicle based on a driving distribution, which is a ratio of the number of driving obstruction vehicles selected by the driving obstruction vehicle inference module 1230 to the number of overlap vehicles selected by the overlap vehicle search module 1220, as disclosed in the following Equation 1.

$$\text{Driving distribution (\%)} = \text{driving obstruction vehicle} / \text{overlap vehicle} \times 100 \quad \text{Equation 1:}$$

For example, the controller 1200 may change the appropriate autonomous driving level to level 1 when the driving distribution exceeds 50%, due to a determination that automation is impossible.

The controller 1200 may determine the autonomous driving level of the ego vehicle from the autonomous driving level information of the overlap vehicle using a learning model trained using an artificial intelligence algorithm. In this case, the learning model may be a model trained using a data set including a driving distribution and the autonomous driving level of the ego vehicle, which are classified by assigning a label for a driving success or failure of a driver.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves inferring the label of unlabeled training data, and then using this inferred label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The controller 1200 may generate a driver's manual driving success rate according to the past driving distribution of the vehicle 1000 in the form of a table, store the generated driver's manual driving success rate in the storage 1900 as driving proficiency information, and determine an appropriate autonomous driving level according to the stored driving proficiency information.

The controller 1200 may verify the autonomous driving level of the ego vehicle, which is determined based on the autonomous driving level information of the overlap vehicle, based on driver information, and change the autonomous driving level of the ego vehicle according to the verification result. In this case, the driver information may be the driving proficiency information or driver's license information.

For example, when the autonomous driving level of the ego vehicle determined based on the autonomous driving level information of the overlap vehicle is level 1 and the driver holds a license exclusively for an autonomous vehicle, the controller 1200 may change the appropriate autonomous driving level to level 3.

The controller 1200, for example, the autonomous driving safety zone search module 1260, may verify the autonomous driving level of the ego vehicle, which is determined based on the autonomous driving level information of the overlap vehicle, based on the driver information, and change the driving route of the ego vehicle according to the verification result.

The controller 1200 may control the operator 1700 to move the ego vehicle to the autonomous driving safety zone in response to the autonomous driving level of the ego vehicle determined based on the autonomous driving level information of the overlap vehicle being required to be changed due to the driver's license information, for example, due to the driver not having a driver's license.

For example, in a case in which the autonomous driving level of the ego vehicle determined based on the autonomous driving level information of the overlap vehicle is level 1 and the driver does not have a driver's license, the controller 1200 may control the operator 1700 to move the ego vehicle to an area in which the ego vehicle can be driven in autonomous driving level 5 based on autonomous driving level map information provided by the navigation 1600.

The controller 1200, for example, the driving guide module 1270, may display the positions of driving obstruction vehicles and the autonomous levels of each vehicle on the navigation map, through the user interface 1300.

The controller 1200 may provide passengers with guidance on the number and driving distribution of the driving obstruction vehicles by voice or video, through the user interface 1300.

Upon determination of a need to change the autonomous driving level or change the driving route based on the driving distribution and the driver information, the controller 1200 may provide guidance on a possible driving change option through the user interface 1300. In this case, the driving change option may include an option to change the autonomous driving level without changing the driving route, an option to change to remote driving without changing the driving route, and an option to change the driving route without changing the autonomous level.

The controller 1200 may provide guidance on the following information according to the options selected by the driver.

When the driver selects the option to change the autonomous driving level without changing the driving route, the controller 1200 may provide the driver with guidance on how the autonomous level is to be changed, a section in which the vehicle is to be driven at the changed level, a speed limit, main driving information, and the like (for example, voice information of "Changing to autonomous driving level 1. The estimated driving section is about 300 m, one unit. A top speed of the driving section is 80 km/h, and there is an accident hazard area on the right side 100 m ahead.") through the user interface 1300.

When the driver selects the option to change to the remote driving without changing the driving route, the controller 1200 may provide the driver with guidance on a remote driving server, remote driving personnel information, a remote driving section, and the like (for example, voice and video information of "Connecting to the closest MEC server A for remote driving. The current remote driver has a driving success rate of 99% in a driving distribution of 60%. The driving section is as displayed in the video.") through the user interface 1300.

When the driver selects the option to change the driving route without changing the autonomous level, the controller 1200 may provide the driver with guidance on the position of the safety zone, the moving route to the safety zone, the vehicle information in the safety zone, and the like (for example, voice information of "The safety zone is the fourth lane. Currently, decelerate and signal to move from the first lane to the fourth lane. There are three vehicles in the safety zone.") through the user interface 1300.

When the driver proficiency in the current driving distribution is less than a predetermined value or the driver does not have a driver's license, referring to the driver information, the controller 1200 may respectively activate only the option to change the driving route without changing the autonomous driving level or the option to change to the remote driving without changing the driving route, among the driving change options.

The controller 1200 may advise the driver to select the option to change the driving route without changing the autonomous driving level in order to reduce the fatigue of the driver when the driving distribution of 3 units or more is greater than or equal to a predetermined value.

The controller 1200 may provide the driver with guidance on the driving change option whenever it is determined that there is a need to change the driving by referring to the autonomous driving level information of the overlap vehicle in real-time, and set the application units of the driving change option to provide guidance on the driving change option according to the autonomous driving level information of the overlap vehicle for each unit. For example, the controller 1200 may divide a driving area having a distance of 1.2 km into four units of 300 m each, collect the autonomous driving level information of the overlap vehicle after driving one unit, and then determine whether the driving change is required when driving the next unit.

The controller 1200, for example, the driving control module 1280, may control the operator 1700 to move the ego vehicle to the safety zone when the driver selects the option to change the driving route.

The controller 1200 may be implemented by using at least one of an application specific integrated circuit (ASIC), a digital signal processor (DSP), a digital signal processing device (DSP), a programmable logic device (PLD), a field programmable gate array (FPGA), a processor, a controller, a micro-controller, a microprocessor, or other electronic units for performing other functions.

The user interface 1300 is used for communication between the vehicle 1000 and the vehicle user. The user interface 1300 may receive an input signal of the user, transmit the received input signal to the controller 1200, and provide information held by the vehicle 1000 to the user by the control of the controller 1200. The user interface 1300 may include, but is not limited to, an input module, an internal camera, a bio-sensing module, and an output module.

The input module is for receiving information from a user. The data collected by the input module may be analyzed by the controller 1200 and processed by the user's control command.

The input module may receive the destination of the vehicle 1000 from the user and provide the destination to the controller 1200.

The input interface may input to the controller 1200 a signal for designating and deactivating at least one of the plurality of sensor modules of the object detector 1400 according to the user's input.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or an image.

The output module may include at least one of a display module, an acoustic output module, and a haptic output module.

The display module may display graphic objects corresponding to various information.

The display module may output a guide image regarding the driving change option under the control of the controller 1200.

The display module may include at least one of a liquid crystal display (LCD), a thin film transistor liquid crystal display (TFT LCD), an organic light emitting diode (OLED), a flexible display, a 3D display, or an e-ink display.

The display module may have a mutual layer structure with a touch input module, or may be integrally formed to implement a touch screen.

The display module may be implemented as a Head Up Display (HUD). When the display module is implemented as an HUD, the display module may include a projection module to output information through an image projected onto a windshield or a window.

The display module may include a transparent display. The transparent display may be attached to the windshield or the window.

The transparent display may display a predetermined screen with a predetermined transparency. The transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The user interface 1300 may include a plurality of display modules.

The display module may be disposed on one area of a steering wheel, one area of an instrument panel, one area of a seat, one area of each pillar, one area of a door, one area of a center console, one area of a head lining, or one area of a sun visor, or may be implemented on one area of a windshield or one area of a window.

The sound output module may convert an electric signal provided from the controller 1200 into an audio signal, and output the audio signal. To this end, the sound output module may include one or more speakers.

The sound output module may output a guide message regarding the driving change option under the control of the controller 1200.

The haptic output module may generate a tactile output. For example, the haptic output module may operate to allow the user to perceive the output by vibrating a steering wheel, a seat belt, and a seat.

The object detector 1400 is for detecting an object located outside the vehicle 1000. The object detector 2400 may generate object information based on the sensing data, and transmit the generated object information to the controller 1200. Examples of the object may include various objects related to the driving of the vehicle 1000, such as a lane, another vehicle, a pedestrian, a motorcycle, a traffic signal, light, a road, a structure, a speed bump, a landmark, and an animal.

The object detector 1400 may include a camera module, light imaging detection and ranging (lidar), an ultrasonic sensor, radio detection and ranging (radar), and an infrared sensor as a plurality of sensor modules.

The object detector 1400 may sense environmental information around the vehicle 1000 through a plurality of sensor modules.

Depending on the embodiment, the object detector 1400 may further include components other than the components described, or may not include some of the components described.

The radar may include an electromagnetic wave transmitting module and an electromagnetic wave receiving module. The radar may be implemented by a pulse radar system or a continuous wave radar system in terms of the radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) scheme or a phase-shift scheme by using an electromagnetic wave as a medium, and may detect the position of the detected object, the distance to the detected object, and a relative speed of the detected object.

The radar may be disposed at an appropriate location outside the vehicle for sensing an object disposed at the front, back, or side of the vehicle.

The lidar may include a laser transmitting module and a laser receiving module. The lidar may be implemented in a TOF scheme or a phase-shift scheme.

The lidar may be implemented as a driven type or a non-driven type.

When the lidar is embodied in the driving method, the lidar may rotate by means of a motor, and detect an object near the vehicle 1000. When the lidar is implemented in the non-driving method, the lidar may detect an object within a predetermined range with respect to the vehicle 1000 by means of light steering. The vehicle 1000 may include a plurality of non-driven type lidars.

The lidar may detect an object based on a TOF scheme or a phase-shift scheme by using a laser beam as a medium, and may detect the position of the detected object, the distance to the detected object, and the relative speed of the detected object.

The lidar may be disposed at an appropriate location outside the vehicle for sensing an object disposed at the front, back, or side of the vehicle.

The image capturer may be disposed at a suitable place outside the vehicle, for example, the front, back, right side mirrors and the left side mirror of the vehicle, in order to acquire a vehicle exterior image. The image capturer may be a mono camera, but is not limited thereto, and may be a stereo camera, an around view monitoring (AVM) camera, or a 360 degree camera.

The image capturer may be disposed close to the front windshield in the interior of the vehicle in order to acquire an image of the front of the vehicle. The image capturer may be disposed around the front bumper or the radiator grill.

The image capturer may be disposed close to the rear glass in the interior of the vehicle in order to acquire an image of the back of the vehicle. The image capturer may be disposed around the rear bumper, the trunk, or the tail gate.

The image capturer may be disposed close to at least one side window in the vehicle in order to obtain an image of the side of the vehicle. In addition, the image capturer may be disposed around the fender or the door.

The ultrasonic sensor may include an ultrasonic transmission module and an ultrasonic reception module. The ultrasonic sensor can detect an object based on ultrasonic waves, and can detect the position of the detected object, the distance to the detected object, and the relative speed of the detected object.

The ultrasonic sensor may be disposed at an appropriate position outside the vehicle for sensing an object at the front, back, or side of the vehicle.

The infrared sensor may include an infrared transmission module and an infrared reception module. The infrared sensor can detect an object based on the infrared light, and can detect the position of the detected object, the distance to the detected object, and the relative speed of the detected object.

The infrared sensor may be disposed at an appropriate location outside the vehicle in order to sense objects located at the front, rear, or side portions of the vehicle.

The controller 1200 may control the overall operation of the object detector 1400.

The controller 1200 may compare data sensed by the radar, the lidar, the ultrasonic sensor, and the infrared sensor with pre-stored data so as to detect or classify an object.

The controller 1200 may detect and track objects based on the acquired image. The controller 1200 may perform operations such as calculating a distance to an object and calculating a relative speed with respect to the object through an image processing algorithm.

For example, the controller 1200 may acquire information on the distance to the object and information on the relative speed with respect to the object on the basis of variation of the object size with time in the acquired image.

For example, the controller 1200 may obtain information on the distance to the object and information on the relative speed through, for example, a pin hole model and road surface profiling.

The controller 1200 may detect and track the object based on the reflected electromagnetic wave that is reflected by the object and returned to the object after being transmitted. The controller 1200 may perform operations such as calculating a distance to an object and calculating a relative speed of the object based on the electromagnetic wave.

The controller 1200 may detect and track the object based on the reflected laser beam that is reflected by the object and returned to the object after being transmitted. The controller 1200 may perform operations such as calculating a distance to an object and calculating a relative speed of the object based on the laser beam.

The controller 1200 may detect and track the object based on the reflected ultrasonic wave that is reflected by the object and returned to the object after being transmitted. The controller 1200 may perform operations such as calculating a distance to an object and calculating a relative speed of the object based on the ultrasonic wave.

The controller 1200 may detect and track the object based on the reflected infrared light that is reflected by the object and returned to the object after being transmitted. The controller 1200 may perform operations such as calculating a distance to an object and calculating a relative speed of the object based on the infrared light.

Depending on the embodiment, the object detector 1400 may include a separate processor from the controller 1200. In addition, each of the radar, the lidar, the ultrasonic sensor and the infrared sensor may include a processor.

When a processor is included in the object detector 1400, the object detector 1400 may be operated under the control of the processor controlled by the controller 1200.

The driving controller 1500 may receive a user input for driving. In the case of the manual mode, the vehicle 1000 may operate based on the signal provided by the driving controller 1500.

The navigation 1600 may provide navigation information to the controller 1200. The navigation information may include at least one of map information, set destination information, route information according to destination setting, information about various objects on the route, lane information, or current location information of the vehicle.

The navigation 1600 may include a memory. The memory may store navigation information. The navigation information may be updated by the information received through the transceiver 1100. The navigation 1600 may be controlled by an internal processor, or may operate by receiving an external signal, for example, a control signal from the controller 1200, but the present disclosure is not limited thereto.

The operator 1700 may control various operations of the vehicle 1000. The operator 1700 may operate in the autonomous driving mode.

The operator 1700 may include a driving module, an unparking module, and a parking module.

Depending on the embodiment, the operator 1700 may further include constituent elements other than the constituent elements to be described, or may not include some of the constitute elements.

The operator 1700 may include a processor under the control of the controller 1200. Each module of the operator 1700 may include a processor individually.

Depending on the embodiment, when the operator 1700 is implemented as software, it may be a sub-concept of the controller 1200.

The driving module may perform driving of the vehicle 1000.

The driving module may receive object information from the object detector 1400, and provide a control signal to a vehicle driving module to perform the driving of the vehicle 1000.

The driving module may receive a signal from an external device via the transceiver 1100, and provide a control signal to the vehicle driving module to perform the driving of the vehicle 1000.

The unparking module may perform unparking of the vehicle 1000.

In the unparking module, navigation information may be provided from the navigation 1600, and a control signal may be provided to the vehicle driving module, so that the unparking of the vehicle 1000 may be performed.

In the unparking module, object information may be received from the object detector 1400, and a control signal may be provided to the vehicle driving module, so that the unparking of the vehicle 1000 may be performed.

The unparking module may receive a signal from an external device via the transceiver 1100, and provide a control signal to the vehicle driving module to perform the unparking of the vehicle 1000.

The parking module may perform parking of the vehicle 1000.

In the parking module, navigation information may be provided from the navigation 1600, and a control signal may be provided to the vehicle driving module, so that the parking of the vehicle 1000 may be performed.

In the parking module, object information may be provided from the object detector 1400, and a control signal may be provided to the vehicle driving module, so that the parking of the vehicle 1000 may be performed.

The parking module may receive a signal from an external device via the transceiver 1100, and provide a control signal to the vehicle driving module so as to perform the parking of the vehicle 1000.

The driving module of the operator 1700 may be provided with the navigation information from the navigation 1600, and may provide a control signal to the vehicle driving module so that driving of the vehicle 1000 may be performed.

The sensor 1800 may sense the state of the vehicle 1000 using a sensor mounted on the vehicle 1000, that is, a signal related to the state of the vehicle 1000, and obtain movement route information of the vehicle 1000 according to the sensed signal. The sensor 1800 may provide the obtained movement route information to the controller 1200.

The sensor 1800 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 1800 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1800 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS).

The sensor 1800 may generate vehicle state information based on sensing data. The vehicle status information may be information generated based on data sensed by various sensors provided in the vehicle.

Vehicle state information may include information such as attitude information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, interior temperature information of the vehicle, interior humidity information of the vehicle, pedal position information, and vehicle engine temperature information.

The storage 1900 is electrically connected to the controller 1200.

The storage 1900 may store basic data for each unit of the apparatus for determining levels of driving automation, control data for operation control of each unit of the apparatus for determining levels of driving automation, and input/output data.

The storage 1900 may store driver information, and provide the stored driver information according to a request of the controller 1200.

The storage 1900 may be various storage devices such as a ROM, a RAM, an EPROM, a flash drive, and a hard drive, in terms of hardware. The storage 1900 may store various data for overall operation of the vehicle 1000, such as a program for processing or controlling the vehicle controller 1200, in particular driver propensity information. Here, the storage 1900 may be formed integrally with the controller 1200 or may be implemented as a sub-component of the controller 1200.

Figure 10:
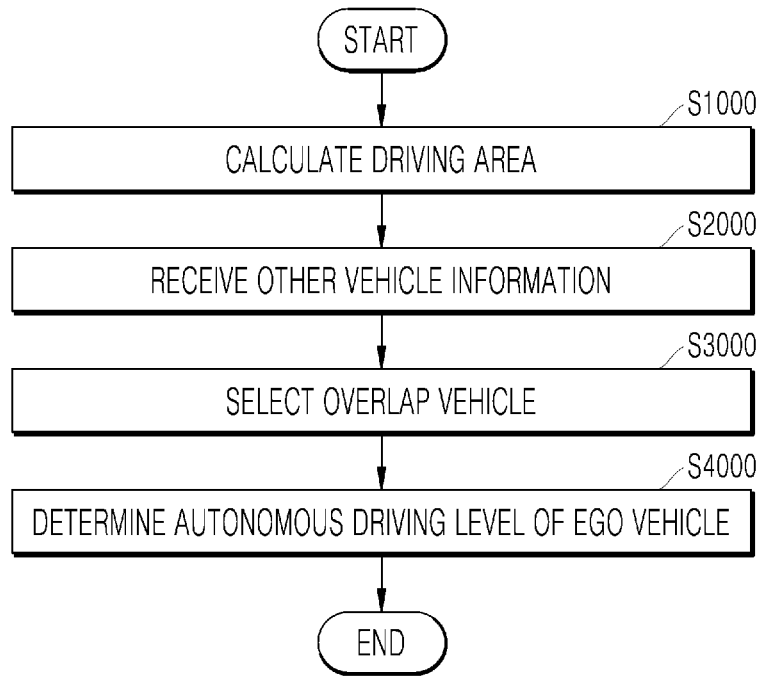
FIGS. 10 and 11 are flowcharts illustrating a method for determining levels of driving automation according to an embodiment of the present disclosure.
Figure 11:
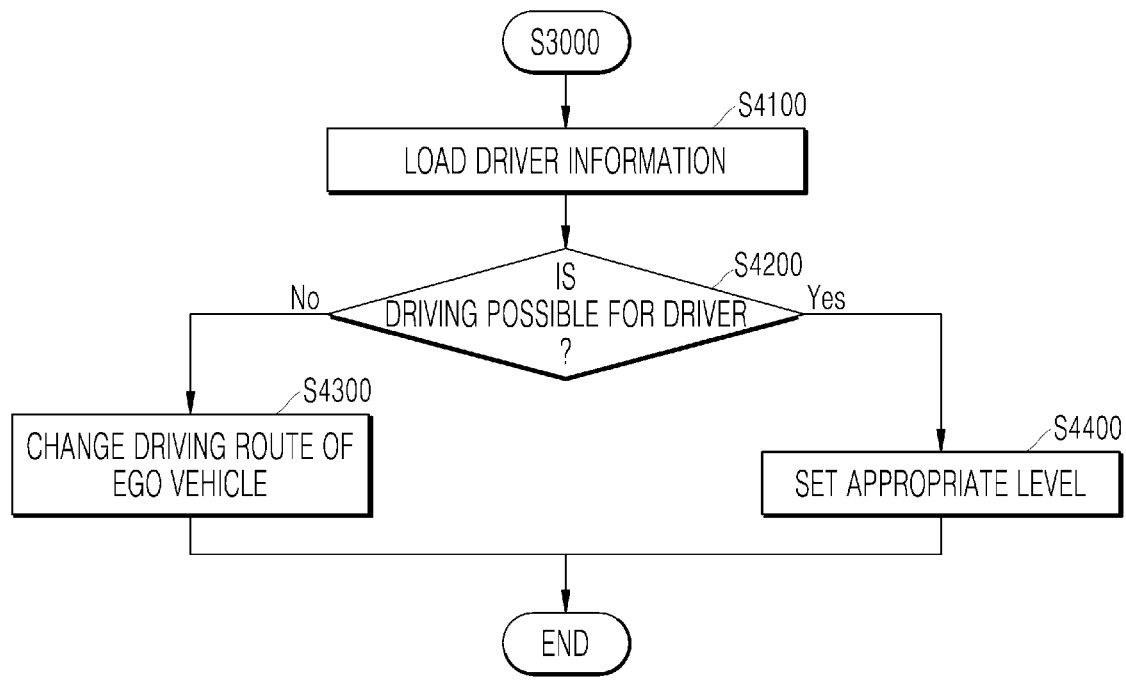

FIGS. 10 and 11 are flowcharts illustrating a method for determining levels of driving automation according to an embodiment of the present disclosure.

Figure 12:
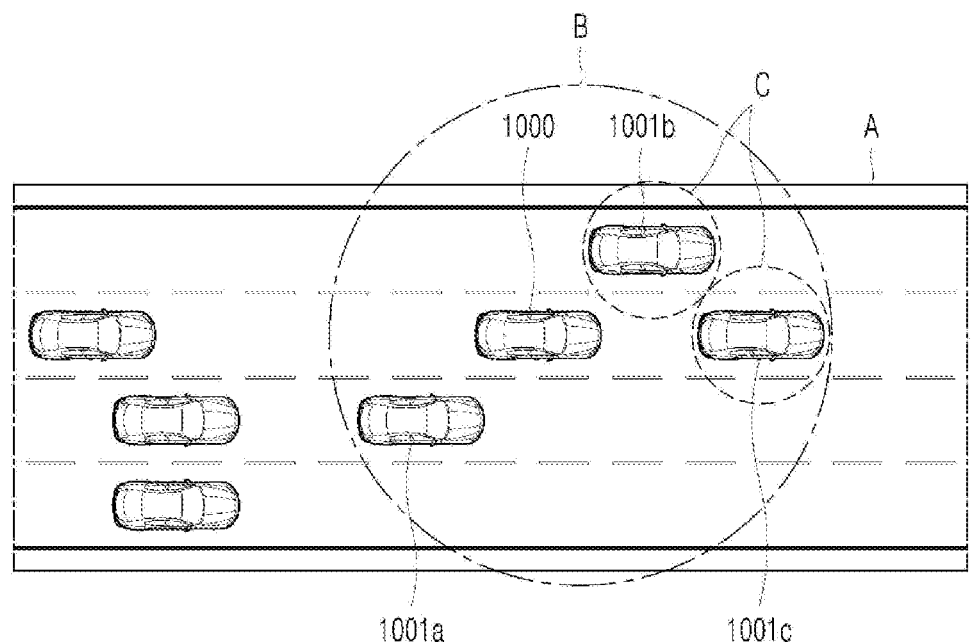
FIG. 12 is a diagram illustrating an operation of an apparatus for determining levels of driving automation according to an embodiment of the present disclosure.

FIG. 12 is a diagram illustrating an operation of the apparatus for determining levels of driving automation according to an embodiment of the present disclosure.

The operations of the method for determining levels of driving automation according to the embodiment of the present disclosure and the apparatus for determining levels of driving automation according to the embodiment of the present disclosure will be described below with reference to FIGS. 10 to 12.

The controller 1200 may calculate the driving area of the ego vehicle by using the predetermined driving route information of the ego vehicle, which is acquired from the navigation 1600 (S1000).

The controller 1200 may receive the autonomous driving level information and the driving information of the plurality of other vehicles in the driving area through the transceiver 1100 (S2000).

Based on the driving information, the controller 1200 may select, as the overlap vehicle, a vehicle driving in a similar driving area to the ego vehicle as well as a vehicle expected to drive in the similar driving area to the ego vehicle, among the plurality of other vehicles (S3000).

The controller 1200 may determine the autonomous driving level of the vehicle 1000, which is the ego vehicle, based on the autonomous driving information of the overlap vehicle (S4000). The controller 1200 may determine the autonomous driving level of the ego vehicle based on the driving distribution, which is the ratio of the number of driving obstruction vehicles selected by the driving obstruction vehicle inference module 1230 to the number of overlap vehicles selected by the overlap vehicle search module 1220, as disclosed in the above Equation 1.

Referring to FIG. 11, in order to determine the autonomous driving level of the ego vehicle or to change the driving route, the controller 1200 may call up the driver information including the driving proficiency information or the driver's license information from the storage 1900 (S4100).

Based on the driver's license information or the proficiency information, the controller 1200 determines whether the autonomous driving level of the ego vehicle determined based on the autonomous driving level information of the overlap vehicle is a level at which the ego vehicle can be driven (S4200).

Upon determining that driving is impossible, the controller 1200 may control the operator 1700 to move the ego vehicle to the autonomous driving safety zone because the driving is not possible at the appropriate autonomous driving level due to, for example, the driver not having a driver's license or having low driving proficiency (S4300).

Upon determining that driving is possible, for example, when the driver has a driver's license and the driver's driving success rate is high in the current driving distribution, the controller 1200 may set the autonomous driving level of the ego vehicle to the determined autonomous driving level (S4400).

As illustrated in FIG. 12, the controller 1200 may receive the predetermined driving route information of the ego vehicle from the navigation 1600, and use the received driving route information of the ego vehicle to calculate a driving area A of the ego vehicle.

The controller 1200 may calculate a possible straight driving distance in consideration of the speed and a route of the vehicle 1000 based on data including a section and a lane where the vehicle 1000 is expected to be driven, and set the calculated distance as the distance of the driving area.

The controller 1200 may refer to the driving information to select, as overlap vehicles, vehicles 1001a, 1001b, and 1001c among the plurality of other vehicles, based on the fact that vehicles 1001a, 1001b, and 1001c are driving in the same lane as the driving lane of the ego vehicle or driving in a similar driving area B (that is, in lanes adjacent to the driving lane of the ego vehicle), within a predetermined distance from the ego vehicle (for example, within 100 meters).

Among the overlap vehicles 1001a, 1001b, and 1001c, the controller 1200 may select the overlap vehicles 1001b and 1001c of which the autonomous driving level is in level 0 to level 2 as driving obstruction vehicles, based on the autonomous driving level information of the overlap vehicles provided through the transceiver 1100.

Upon determining that driving is impossible, for example, when the driver does not have a driver's license or has low driving proficiency, even though as illustrated in FIG. 12 the driving distribution, at approximately 67%, exceeds 50%, the controller may control the operator 1700 to move the ego vehicle 1000 to the autonomous driving safety zone.

The controller 1200 may select the safety zone in consideration of traffic volume, a distribution of autonomous vehicles, and the like.

The present disclosure described above may be embodied as computer-readable codes on a medium on which a program is recorded. The computer readable medium includes all types of recording devices in which data readable by a computer system readable may be stored. Examples of computer readable media may include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and the computer readable medium may also be implemented in the form of a carrier wave (for example, transmission over the Internet). Moreover, the computer may include a processor or a controller. Accordingly, the above detailed description should not be construed as limiting in all aspects and should be considered as illustrative. The scope of the present disclosure should be determined by reasonable interpretation of the appended claims, and all changes within the equivalent scope of the present disclosure are included in the scope of the present disclosure.

What is claimed is:

1. An apparatus for determining levels of driving automation, the apparatus comprising:
   a controller configured to:
      receive a predetermined driving route information including a section and a lane where an ego vehicle is expected to be driven, and
      calculate a driving area the ego vehicle using the predetermined driving route information of the ego vehicle;
   a transceiver configured to receive autonomous driving level information and driving information of a plurality of other vehicles in the driving area; and
   a storage configured to store driver information,
   wherein the controller is further configured to:
      select an overlap vehicle among the plurality of other vehicles based on the driving information,
      determine an autonomous driving level of the ego vehicle based on the autonomous driving level information of the overlap vehicle, and
      control operations of the ego vehicle based on the autonomous driving level, which is defined by the Society of Automotive Engineers International and defines modules which the ego vehicle operates without human input, of the ego vehicle,
      wherein the controller is further configured to:
      verify the autonomous driving level of the ego vehicle, which is determined based on the autonomous driving level information of the overlap vehicle, based on the driver information;
      select a safety zone based on a traffic volume and a distribution of autonomous vehicles; and
      change the driving route of the ego vehicle according to the verification result, and
   wherein the changed driving route of the ego vehicle in the safety zone in which the ego vehicle can be driven in the determined autonomous driving level is based on autonomous driving level map information.

2. The apparatus of claim 1, wherein the controller is configured to select, as the overlap vehicle, a vehicle among the plurality of other vehicles that is driving in the same lane as a driving lane of the ego vehicle or driving in a lane adjacent to the driving lane of the ego vehicle, within a predetermined distance from the ego vehicle.

3. The apparatus of claim 1, wherein the controller is configured to:
   select, as a driving obstruction vehicle, an overlap vehicle of which the autonomous driving level is in level 0 to level 2 as defined by the Society of Automotive Engineers International, based on the autonomous driving level information of the overlap vehicle; and
   determine the autonomous driving level of the ego vehicle based on a ratio of the number of driving obstruction vehicles to the number of overlap vehicles.

4. The apparatus of claim 3, wherein the controller is configured to determine the autonomous driving level of the ego vehicle from the autonomous driving level information of the overlap vehicle using a learning model which is trained using an artificial intelligence algorithm, and
   the learning model is a model trained using a data set including the ratio of the number of driving obstruction vehicles to the number of overlap vehicles and the autonomous driving level of the ego vehicle, which are classified by assigning a label for a driving success or failure of a driver.

5. The apparatus of claim 1,
   wherein the controller is configured to:
      change the autonomous driving level of the ego vehicle according to the verification result.

6. The apparatus of claim 1, wherein the driver information is driver's license information.

7. The apparatus of claim 6, wherein the controller is configured to move the ego vehicle to an autonomous driving safety zone in response to the autonomous driving level of the ego vehicle determined based on the autonomous driving level information of the overlap vehicle being required to be changed due to the driver not having a driver's license.

8. The apparatus of claim 1, wherein the transceiver is configured to receive the driving information based on a downlink grant of a 5G network connected for the ego vehicle to operate in an autonomous driving mode.

9. A method for determining levels of driving automation, the method comprising:
   storing driver information;
   receiving predetermined driving route information including a section and a lane where an ego vehicle is expected to be driven;
   calculating a driving area of the ego vehicle using the predetermined driving route information of the ego vehicle;
   receiving autonomous driving level information and driving information of a plurality of other vehicles in the driving area;
   selecting an overlap vehicle among the plurality of other vehicles based on the driving information;
   determining an autonomous driving level of the ego vehicle based on the autonomous driving level information of the overlap vehicle;
   controlling operations of the ego vehicle based on the autonomous driving level, which is defined by the Society of Automotive Engineers International and defines modules which the ego vehicle operates without human input, of the ego vehicle, verifying the autonomous driving level of the ego vehicle, which is determined based on the autonomous driving level information of the overlap vehicle, based on the driver information;

selecting a safety zone based on a traffic volume and a distribution of autonomous vehicles; and changing the driving route of the ego vehicle according to the verification result in the verifying, wherein the changed driving route of the ego vehicle in the safety zone in which the ego vehicle can be driven in the determined autonomous driving level is based on autonomous driving level map information.

10. The method of claim 9, wherein the selecting of an overlap vehicle among the plurality of other vehicles comprises selecting, as the overlap vehicle, a vehicle among the plurality of other vehicles that is driving in the same lane as a driving lane of the ego vehicle or driving in a lane adjacent to the driving lane of the ego vehicle, within a predetermined distance from the ego vehicle.

11. The method of claim 9, wherein the determining of an autonomous driving level of the ego vehicle comprises:

selecting, as a driving obstruction vehicle, an overlap vehicle of which the autonomous driving level is in level 0 to level 2 as defined by the Society of Automotive Engineers International, based on the autonomous driving level information of the overlap vehicle; and determining the autonomous driving level of the ego vehicle based on a ratio of the number of driving obstruction vehicles to the number of overlap vehicles.

12. The method of claim 11, wherein the determining of the autonomous driving level of the ego vehicle based on a ratio of the number of driving obstruction vehicles to the number of overlap vehicles comprises determining the autonomous driving level of the ego vehicle from the autonomous driving level information of the overlap vehicle using a learning model which is trained using an artificial intelligence algorithm, and the learning model is a model trained using a data set including the ratio of the number of driving obstruction vehicles to the number of overlap vehicles and the autonomous driving level of the ego vehicle, which are classified by assigning a label for a driving success or failure of a driver.

13. The method of claim 9, further comprising:

changing the autonomous driving level of the ego vehicle according to the verification result in the verifying.

14. The method of claim 10, wherein the driver information is driver's license information.

15. The method of claim 14, wherein the changing of the driving route of the ego vehicle comprises moving the ego vehicle to an autonomous driving safety zone in response to the autonomous driving level of the ego vehicle determined based on the autonomous driving level information of the overlap vehicle being required to be changed due to the driver not having a driver's license.

16. The method of claim 9, wherein the receiving of driving information comprises receiving the driving information based on a downlink grant of a 5G network connected for the ego vehicle to operate in an autonomous driving mode.

17. A non-transitory computer-readable recording medium on which an autonomous driving level determining program is recorded, the autonomous driving level determining program causing a computer to perform:

storing driver information;

receiving predetermined driving route information including a section and a lane where an ego vehicle is expected to be driven;

calculating of a driving area of the ego vehicle using the predetermined driving route information of the ego vehicle;

receiving of autonomous driving level information and driving information of a plurality of other vehicles in the driving area;

selecting of an overlap vehicle among the plurality of other vehicles based on the driving information;

determining of an autonomous driving level of the ego vehicle based on the autonomous driving level information of the overlap vehicle, controlling operations of the ego vehicle based on the autonomous driving level, which is defined by the Society of Automotive Engineers International and defines modules which the ego vehicle operates without human input, of the ego vehicle, verifying the autonomous driving level of the ego vehicle, which is determined based on the autonomous driving level information of the overlap vehicle, based on the driver information;

selecting a safety zone based on a traffic volume and a distribution of autonomous vehicles; and changing the driving route of the ego vehicle according to the verification result in the verifying, wherein the changed driving route of the ego vehicle in the safety zone in which the ego vehicle can be driven in the determined autonomous driving level is based on autonomous driving level map information.

* * * * *